United States Patent [19]

Sack

[11] 3,784,387

[45] Jan. 8, 1974

[54] GLASS COMPOSITIONS OF LOW INHERENT RADIOACTIVITY

[75] Inventor: Werener Sack, Mainz-Gonsenheim, Germany

[73] Assignee: JENAer Glaswerk Schott & Gen., Mainz, Germany

[22] Filed: Mar. 4, 1971

[21] Appl. No.: 121,166

[30] Foreign Application Priority Data
Mar. 6, 1970 Germany............P 20 10 683.6

[52] U.S. Cl. .................................................. 106/54
[51] Int. Cl. ......... C03c 3/08, C03c 3/10, C03c 3/30
[58] Field of Search ....................................... 106/54

[56] References Cited
UNITED STATES PATENTS

| | | | |
|---|---|---|---|
| 2,688,560 | 9/1954 | Armstead | 106/52 |
| 1,130,767 | 3/1915 | Schott | 106/54 |
| 1,143,732 | 6/1915 | Schott | 106/54 |

FOREIGN PATENTS OR APPLICATIONS

| | | | |
|---|---|---|---|
| 605,656 | 7/1948 | Great Britain | 106/54 |
| 1,257,574 | 2/1961 | France | 106/54 |
| 88,164 | 5/1958 | Netherlands | 106/54 |

Primary Examiner—A. B. Curtis
Assistant Examiner—Mark Bell
Attorney—Burgess, Dinklage & Sprung

[57] ABSTRACT

Borosilicate glass of low inherent radioactivity, free of potassium oxide.

9 Claims, No Drawings

GLASS COMPOSITIONS OF LOW INHERENT RADIOACTIVITY

The invention relates to glass compositions of very low inherent radioactivity.

A glass of this kind is needed in a number of forms, e.g., tubes, containers such as flasks and vials, especially for radiochemical work and for the manufacture of radiation measuring apparatus. The following factors are determinative of the suitability of such a glass:

1. Low inherent radioactivity.
2. High phototransmission in the visible and shortwave range up to 350 nm.
3. Good resistance to devitrification.
4. Good working qualities, i.e., low viscosity in the glass working temperature range, to make it suitable for automatic manufacture.

The object of the present invention is the development of a glass composition having the above-named four qualities.

This objective is achieved according to the invention in that the glass is free of potassium oxide and can best be of the following composition in weight-percent, based on the composition of the melt from which it is formed.

$SiO_2$ — 65 – 66%
$B_2O_3$ — 12%
$Al_2O_3$ — 5%
$Na_2O$ — 6 – 6.5%
$ZnO$ — 3.5 – 8%
$BaO + CaO$ — 3 – %7.5
$ZnO + BaO + CaO$ — 11%

The substitution of calcium oxide for the barium oxide results in slightly more viscous glasses, so that preference must be given to barium oxide. Preferably the BaO+CaO content is entirely BaO. The addition of more than 8 wt-percent of zinc oxide impairs resistance to devitrification. The glasses of the invention have a thermal expansion coefficient that is about 20 $\alpha$-units greater than that of the borosilicate glasses of the prior art containing no bivalent metal oxides, which have thermal expansion coefficients of about 31 to 33, especially around $32 \times 10^{-7}$ per degree Celsius for the range of 20 to 300° C. The glasses of the invention are thus about 115° C and 175° C. lower in viscosity in the softening point ($E_W$) and working point ($V_A$), respectively; that is, they are decidedly softer in the working processes.

For the achievement of a high light transmittancy in the shortwave range it is advantageous to have a reducing agent present in the mixture, such as sugar or powdered wood charcoal, in quantities of 0.05 to 0.15 weight-percent of the oxides. At the same time, it is necessary to use the purest possible raw materials, in order to minimize the impairment of ultraviolet transmission by tinting substances such as $Fe_2O_3$, $Cr_2O_3$, $TiO_2$, and $CeO_2$.

For the refinement of this glass, which is to be melted free of oxidants, it is desirable to additionally introduce up to 0.30, e.g. 0.1 - 0.3, wt-percent (of the oxides) of sodium chloride (NaCl) and 0.20, e.g. 0.05 - 0.2, wt-percent (of the oxides) of fluorine (F) in the form of sodium silicofluoride ($Na_2SiF_6$).

The percentages of the reducing agents and refining agents are, as stated above, additionally introduced, so that the percentage total, with these agents included, will come to more than 100.

The measurement of the inherent radioactivity of the glass can be performed for example, by means of a $\beta$-anti-coincidental counter (low-background counter). This apparatus counts $\beta$-rays and to some extent $\alpha$-rays and $\gamma$-rays as well. The zero rate of the counter with which the measurements were performed amounted to 0.7 pulses per minute.

The glasses according to the invention have pulse rates of 0.1 to 0.4 pulses per minute, which corresponds to a potassium decay rate of 0.25 to 0.9 disintegrations per minute per gram. It must therefore be regarded as a glass having an extremely low inherent radio activity.

The variations in the pulse rates are caused by contamination of the raw materials of the glass and of the refractory materials of the melting units by radioactive isotopes, such as those contained in potassium oxide for example ($K^{40}$) and those which might also be contained in barium compounds (isotopes of the uranium series). It is therefore necessary to test the raw materials of the glass for these undesirable contaminants before they are used. Certain refractory materials generally used in the melting units exhibit high radioactive contamination, i.e., they produce high pulse rates. It has been found that it is not potassium compounds but uranium and radium compounds and their secondary products that are responsible for this. For the production of a glass of low inherent radioactivity it is therefore additionally necessary that the refractory material of the melting units have a low inherent radioactivity as well.

Example of a preferred batch composition in wt-percent, together with the physical and chemical characteristics of same:

TABLE 1

| | |
|---|---|
| $SiO_2$ | 65.50% |
| $B_2O_3$ | 12.00 |
| $Al_2P_3$ | 5.00 |
| $Na_2O$ | 6.50 |
| $ZnO$ | 8.00 |
| $BaO$ | 3.00 |
| NaCl (fining agent) | 0.30 |
| F (fining agent) | 0.20 |
| Sugar (reducing agent) | 0.05 |
| Total wt-% | 100.55% |

$\alpha \times 10^7$ (20°– 300°C)/°C: 52
$T_g$ (°C); $\eta \sim 10^{13.5}$ poises: 520
Softening point (°C); $\eta \sim 10^{7.6}$ poises: 735
Working point (°C); $\eta \sim 10^4$ poises: 1090
Density (g/ccm): 2.48
$Tk100(°C); \rho = 1 \cdot 10^8 .\Omega cm$: 200

Crystallization maximum (°C) — 880
Rate of crystallization at maximum — 0.10 $\mu$m/min.

Transmission for 1 mm thickness and 350 nm (%) — 90

Pulses per minute — 0.1 - 0.4

Resistance to hydrolysis per DIN 12,111—0.014 (1st Class)

Resistance to acids per DIN 12,116—2.5 (2nd Class)

Resistance to alkalies per DIN 52,322—170 (3rd Class)

EXAMPLE

Amounts of raw materials required for 100 kg calculated glass:

65.50 kg sand (German Sipur quality), 21.30 kg boric acid, B(OH)$_3$, 7.60 kg hydrate of alumina, Al(OH)$_3$, 11.00 kg soda, 8.00 kg zinc oxide (German Weisssiegel quality), 3.90 kg barium carbonate, 0.30 kg sodium chloride, 0.33 kg sodium silicofluoride, 0.05 kg sugar, i.e., sucrose.

A ceramic crucible of appropriate capacity is used for the melting of this glass. The melting of the batch is performed in equal portions between 1,400° and 1,460° C within 10 to 12 hours. The portions, each amounting to about 10 kg of the batch mixture, are charged into the crucible at 1-hour intervals. After melting is complete, the temperature is raised to 1,460° - 1,480° C and maintained for 12 to 14 hours to refine and homogenize the melt. Then the temperature is reduced by about 60° to 80° C. per hour, down to the working temperature of 1,150° - 1,170° C. and held at this temperature for about 2 to 3 hours until the working is started. The articles made from the melt are cooled between 530° and 540° C. in an electrically heated lehr for a period of ½ to 2 hours, depending on the wall thickness of the product. Rate of cooling down to room temperature: about 150° to 250° C. per hour.

By "free of potassium oxide" is meant containing less than 0.001 wt-percent (based on the weight of the other oxides) of potassium.

Composition according to the invention are as follows:

TABLE 2.

| | Broad Range | Preferred range |
|---|---|---|
| SiO$_2$ | 63–68 | 65–66 |
| B$_2$O$_3$ | 10–13 | 11–12 |
| Al$_2$O$_3$ | 4–6 | 4.5–5.5 |
| Na$_2$O | 5.5–7.5 | 6–7 |
| ZnO | 2–9 | 3.5–8 |
| BaO +CaO | 2–9 | 3–7.5 |
| ZnO+BaO+CaO | 11 | 11 |
| $\alpha \times 10^7$ (20–300°C)/°C: | 50–54 | 52 |
| Tg (°C); $\eta \sim 10^{13.5}$ poises: | 510–550 | 520 |
| Softening point (°C); $\eta \sim 10^{7.6}$ poises: | 720–760 | 735 |
| Working point (°C); $\eta \sim 10^4$ poises: | 1070–1120 | 1090 |
| Density (g/ccm): | 2.45–2.51 | 2.48 |
| Tk100(°C); $\rho = 1 \cdot 10^8 \Omega \cdot$ cm: | 190–220 | 200 |
| NaCl in melt (wt.% of oxides) | 0–0.3 | 0.1–0.3 |
| F in melt as Na$_2$SiF$_6$ (wt.% of oxides) | 0–0.2 | 0–0.2 |
| Sugar in melt (wt.% of oxides) | 0–0.15 | 0.05–0.10 |

What is claimed is:

1. Borosilicate glass of low inherent radioactivity, characterized in that it is free of potassium oxide, consisting essentially of, in weight percent on a melt basis SiO$_2$ — 63–68%
   B$_2$O$_3$ — 10–13%
   Al$_2$O$_3$ — 4–6%
   Na$_2$O — 5.5–7.5%
   ZnO — 2–9%
   BaO+CaO — 2–9%
   ZnO+BaO+CaO — 11 the radioactivity of said glass being a pulse rate of less than 0.4 pulses per minute as determined with a β-anti-coincidental counter.

2. Glass tubing according to claim 1.
3. Glass container according to claim 1.
4. Glass according to claim 1, consisting essentially of:

SiO$_2$ — 65.5%
   B$_2$O$_3$ — 12.0%
   Al$_2$O$_3$ — 5.0%
   Na$_2$O — 6.5%
   ZnO — 8.0%
   BaO — 3.0%

5. Glass according to claim 1, said BaO+CaO content being entirely BaO.
6. Glass according to claim 1, essentially free of Fe$_2$O$_3$, Cr$_2$O$_3$, TiO$_2$ and CeO$_2$.
7. Method of producing glass having radioactivity of less than 0.4 pulses per minute as determined with a β-anti-coincidental counter, which comprises forming a melt of the following composition in weight percent on an oxide basis:

SiO$_2$ — 63–68%
   B$_2$O$_3$ — 10–13%
   Al$_2$O$_3$ — 4–6%
   Na$_2$O — 5.5–7.5%
   ZnO — 2–9%
   BaO+CaO — 2–9%
   ZnO+BaO+CaO — 11%, and including in the batch from which the melt is formed, in weight percent of said oxides, 0.05–0.15 wt.percent of a reducing agent.

8. Method of claim 7, said composition being:

SiO$_2$ — 65.5%
   B$_2$O$_3$ — 12.0%
   Al$_2$O$_3$ — 5.0%
   Na$_2$O — 6.5%
   ZnO — 8.0%
   BaO — 3.0%

9. Method according to claim 7, said BaO+CaO content being entirely BaO.

* * * * *